Feb. 9, 1965  H. L. JOHNSON ET AL  3,169,009
TIME CYCLE CONTROLLER
Filed Aug. 4, 1961  2 Sheets-Sheet 1
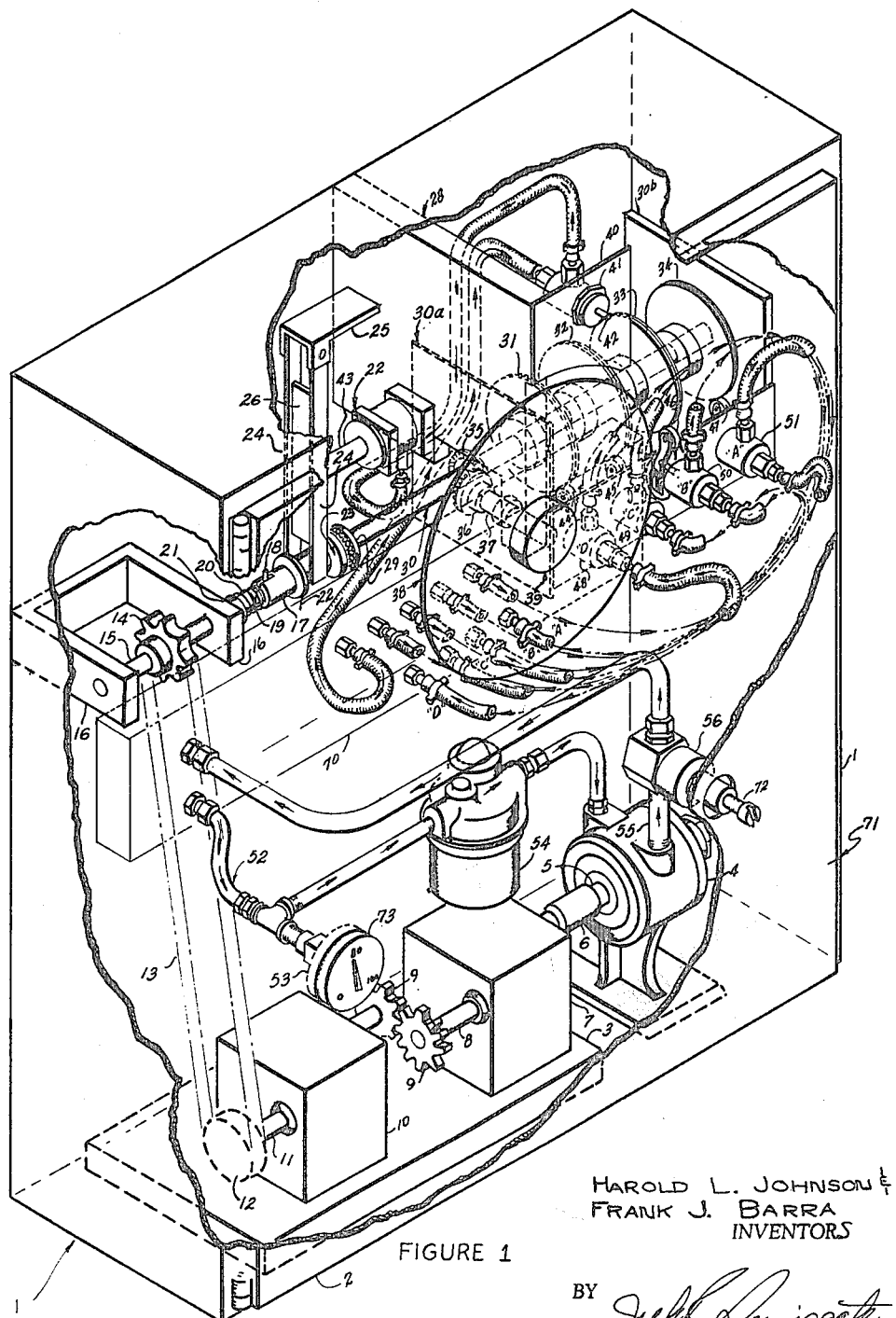
FIGURE 1
HAROLD L. JOHNSON &
FRANK J. BARRA
INVENTORS
BY 
ATTORNEY

HAROLD L. JOHNSON &
FRANK J. BARRA
INVENTORS

BY

ATTORNEY

United States Patent Office 3,169,009
Patented Feb. 9, 1965

3,169,009
TIME CYCLE CONTROLLER
Harold L. Johnson and Frank J. Barra, both of Oklahoma City, Okla., assignors to Black, Sivalls & Bryson, Inc., Kansas City, Mo., a corporation of Delaware
Filed Aug. 4, 1961, Ser. No. 129,349
7 Claims. (Cl. 253—39)

The present invention relates generally to a timing device for controlling actuation of various elements in a process. The present invention relates specifically to a gas operated time cycle controller having adjustable cams.

Prior to the present invention electric time cycle controllers were generally used to control processes and in particular batch processes such as the solid desiccant drying of natural gas. Electric controllers often presented a considerable problem since many sites selected for the processing of a natural gas stream will not have electricity readily available. It would seem to be obvious that a gas-powered time cycle controller should have been developed. Prior to the present invention no gas-powered time cycle controller has been presented to the market which is suitable in accuracy and flexibility of timing to have application to the control of the cycles in batch processing. The ready availability of natural gas at the sites of such installations dictates that a controller powered by natural gas and using natural gas as a control medium be used provided that such controller has sufficient flexibility and accuracy to provide proper control of such processes. Prior to the present invention none of the gas-powered controllers which were available had sufficient flexibility of control or accuracy of timing to provide adequate control of batch processes. It is therefore a primary object of the present invention to provide a time cycle controller which may be powered by natural gas.

Another important object of the persent invention is to provide a gas-powered time cycle controller having an adjustable cam system for varying the periods of actuation. Another object of the present invention is to provide an adjustable cam having particular application to a gas-powered time cycle controller. Still another object of the present invention is to provide a gas-powered time cycle controller which has time accuracy.

These and other objects of the present invention are fully explained and set forth in the accompanying specification and drawings wherein:

FIG. 1 is a view of the apparatus constructed in accordance with the principles of the present invention with portions of the case and other parts being broken away to provide a clearer view of certain details.

Figure 2:
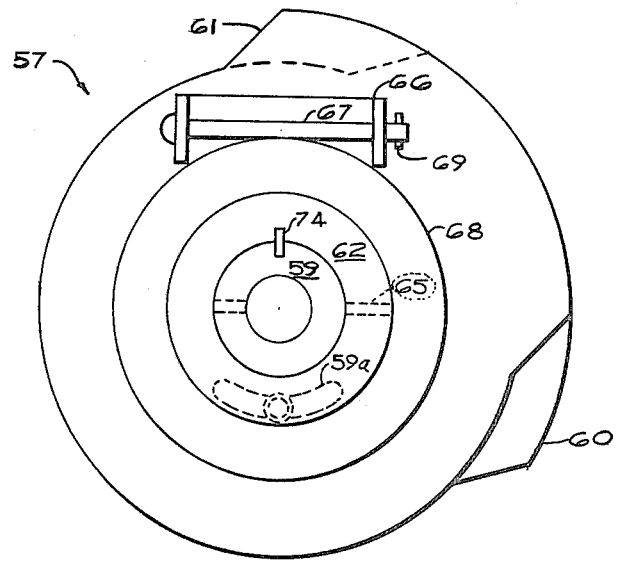
FIG. 2 is a front view of a cam assembly.

Referring more in detail to the drawings:

The device illustrated in FIG. 1 is shown to be mounted in case 1 which has a hinged cover 2 attached to the front of case 1. Hinged cover 2 is partially shown to provide an unobstructed view of the elements of the present invention contained within case 1. Within case 1 and mounted on its bottom 3 is motor 4. Shaft 5 of motor 4 is connected through flexible coupling 6 to gear reducer 7. The outlet shaft 8 of gear reducer 7 is connected through gears 9 to gear reducer 10. The outlet shaft 11 of gear reducer 10 is provided with sprocket 12 which engages chain 13. Chain 13 extends around sprocket 14 which is mounted on shaft 15. Shaft 15 is supported by bracket 16 and extends beyond bracket 16 into sleeve 17. Pin 18 extends from shaft 15 and is positioned in slot 19 in sleeve 17 to cause turning engagement between shaft 15 and sleeve 17. Spring 20 engages collar 21 and sleeve 17 and is designed to exert a force on sleeve 17 away from collar 21. Collar 22 is an integral part of sleeve 17 and is positioned on sleeve 17 as shown. The end of sleeve 17 away from spring 20 is secured to gear 23. Arms 24 extend downwardly from their pivotal connection with bracket 25 and are secured together by plate 26. Arms 24 engage opposite sides of sleeve 17 between collar 22 and gear 23. Actuator 27 is secured to wall 28 and engages plate 26 so that when it is actuated, it will cause arms 24 to move causing sleeve 17 to move and thereby disengaging gear 23 from gear 29. During normal operation gear 23 will engage gear 29 so that rotation of shaft 15 will cause shaft 30 to rotate at the same speed. Shaft 30 is supported by plates 30a and 30b, preferably by suitable bearings (not shown) to provide adequate support and allow freedom of rotation of shaft 30.

Cam assemblies 31, 32, 33 and 34 are connected to shaft 30. Gear 35 is also secured on shaft 30 and engages gear 36. Gear 36 is secured to shaft 37 which extends through wall 28 and terminates in circular plate 38 and knob 39. The purpose of circular plate 38 and knob 39 is to provide a positioning of cam assemblies 31, 32, 33 and 34 and an indication of their positions with respect to the desired time cycle. This positioning can be readily accomplished when gears 23 and 29 are held apart by twisting knob 39 until the markings on circular plate 38 indicate that the cam assemblies 31, 32, 33 and 34 are properly positioned.

Mounting bracket 40 is secured to the outer edge of wall 28 and supports valve 41 which extends through bracket 40 with its actuating stem 42 facing outwardly as shown. One connection of valve 41 is made to a suitable supply of gas and the other connection to actuator 27. It is suggested that such connections be made with flexible tubing or other suitable tubing material which is designed to carry the pressure of the gas used in the actuation of actuator 27. When actuating stem 42 of valve 41 is pushed manually, it will position valve 41 whereby the source of pressure is connected through valve 41 into actuator 27 causing it to extend. Since operating arm 43 of actuator 27 is connected to plate 26 between arms 24, it will push on plate 26 causing arms 24 to engage collar 22 on sleeve 17 whereby gear 23 is disengaged from gear 29. With gears 23 and 29 being disengaged, cam assemblies 31, 32, 33 and 34 can be preset to the desired position by turning knob 39, their position being indicated by markings on circular plate 38. The markings on circular plate 38 will show the position of the cam assemblies during operation of the device of the present invention. When the pressure is released from actuator 27, spring 20 will cause gears 23 and 29 to again engage.

Each of the cam assemblies 31, 32, 33 and 34 is provided with a cam follower 44, 45, 46 and 47 respectively, each of which engages one of three-way valves 48, 49, 50 and 51 respectively. Each of valves 48, 49, 50 and 51 is connected to a source of gas pressure and to a control mechanism (not shown). The function of valves 48, 49, 50 and 51 is to provide a connection between the source of gas pressure and the control mechanism and to exhaust the gas from the control mechanism at the proper predetermined time. The detail of cam assemblies 31, 32, 33 and 34 is such that this function is provided and is exceptionally flexible. These details are hereinafter more fully described.

Inlet line 52 provides a source of pressure regulated gas to power motor 4. Line 52 connects into pressure gauge 53 and through lubricator 54 into the inlet port of motor 4. Line 55 connects from the outlet port of motor 4 to regulator 56 which is provided to control the flow of gas through motor 4 and thereby control the speed of motor 4.

A typical example of operation of the present invention would be an application in which it is desired to have three phases of operation, each of which is to last thirty minutes. The total time involved in a complete operation including all three phases would be one hour and thirty minutes. In such applications shaft 5 and motor 4 would rotate at a speed of 1,000 revolutions per hour as this gear reduction rating is 600 to 1. The rotational shaft speed is further reduced in gear reducer 10 so that outlet shaft 11 of gear reducer 10 will rotate once every ninety minutes. The gear reduction ratio of gear reducer 10 is 150 to 1. The rotation of shaft 11 is transmitted through gear 12 and chain 13 to sprocket 14 and shaft 15 whereby shafts 15 and 30 both rotate once every ninety minutes. Since it is desired that three operations be timed, three cam assemblies should be used with each assembly being set to have an effective engagement angle of 120°. It is generally preferred that the cam assemblies be positioned to be staggered so that when one is actuating a control mechanism, the other two will be in an inactive position. With this arrangement of cam assemblies, each one of the assemblies will be in an actuating position for thirty minutes and will be in a nonactuating position for sixty minutes. While one of the assemblies is in an actuating position, the other two should be in the nonactuating position. It should be noted, however, that this is only one type of process that can be controlled and that any overlapping of actuating position times can be made without deviating from the spirit of the present invention. One advantage of the present invention is that the cam assemblies are of a sufficiently flexible design to allow the overlapping of actuating positions without requiring change of cam plates but merely a simple adjustment of the cam assembly as hereinafter more fully described. Further, it should be noted that if a change in the cycle time is desired, this may be accomplished by changing the speed of motor 4 by adjusting regulator 56 so that motor 4 is operating at a speed providing the desired speed of rotation of shaft 30 and cam assemblies 31, 32, 33 and 34.

Figure 3:
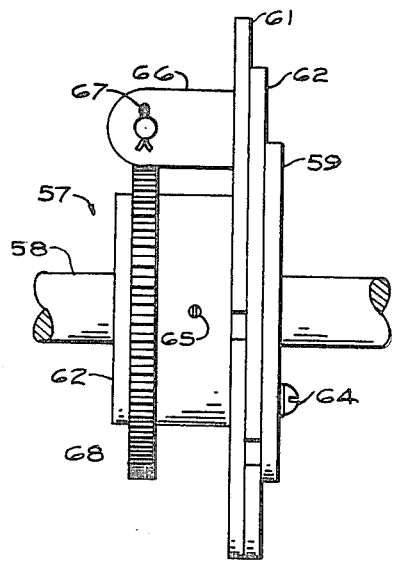
FIG. 3 is a side view of the cam assembly shown in FIG. 2.

Cam assemblies 31, 32, 33 and 34 are all substantially identical in structure and cam assembly 57 as illustrated in FIGS. 2 and 3 is used to explain the details of structure of the novel cam assemblies of the present invention. It should be understood that the shape of these cams may be varied without departing from the present invention. Cam assembly 57 is mounted on shaft 58 and is composed of cam hub 59, cam discs 60 and 61 and cam gear 62. Cam hub 59 is secured on shaft 58 by set screw 63. Cam discs 60 and 61 are mounted on cam hub 59 and cam disc 60 is secured to cam hub 59 by screw 64. Cam gear 62 is also mounted on cam hub 59 and is secured in position by set screw 65. Screw 64 extends through slot 59a in cam hub 59 and thereby provides for adjustment of cam disc 60 with respect to the position of cam hub 59. Bracket 66 is secured to cam disc 61 on the side of cam disc 61 away from cam disc 60. Bracket 66 is designed to project from cam disc 61 a sufficient distance so that screw 67 which extends across bracket 66 will engage gear teeth 68 of cam gear 62. Screw 67 is not threadedly engaged into bracket 66 and therefore is provided with cotter pin 69 through its shank end to keep it in position within bracket 66.

With cam discs 60 and 61 positioned with respect to each other as shown in FIG. 2 their relative position may be changed by turning screw 67. Turning of screw 67 causes cam disc 61 to move with respect to cam gear 62 since the threads of screw 67 engage gear teeth 68 of cam gear 62. It is suggested that cam disc 60 first be positioned with respect to the other cam assemblies (not shown in FIGS. 2 and 3) used with cam assembly 57. Referring to FIG. 1, adjustments of the cam discs of cam assemblies 31, 32, 33 and 34 should be made at a time when gears 23 and 29 are disengaged. Cam discs 60 and 61 should be positioned whereby the markings on circular plate 38 will show the actual positioning of the cams or the operation which they will actuate when so positioned. Cam disc 60 may be readily adjusted by loosening screw 64 and rotating cam disc 60 to its desired position with respect to shaft 58 and cam hub 59. After proper positioning of cam disc 60, screw 64 should be tightened to prevent any slippage of cam disc 60. With cam disc 60 secured in position with respect to shaft 58, the adjustment of the position of cam disc 61 with respect to cam gear 62 as previously described will also position cam disc 61 with respect to cam disc 60.

Bar 70 is secured to the back portion of case 1 as shown in FIG. 1 and is used to provide a manifold for the source of supply gas and also as a means of providing external connections for the parts of the present invention to avoid having tubing and connections extending through case 1. Front plate 71 is provided with apertures for the exposure of the regulating screw 72 of regulator 56 and the dial face 73 of pressure gauge 53.

Keyway 74 is provided in cam gear 62, cam hub 59 and cam discs 60 and 61 to allow a key to be used for initial positioning of cam gear 62 and cam discs 60 and 61 with respect to cam hub 59. If any additional adjustments are to be made, the key (not shown) used for this initial adjustment must be removed so that cam disc 61 may be positioned with respect to cam disc 60 and cam disc 60 may be positioned with respect to cam hub 59.

In operation the time cycle controller is started initially with gears 23 and 29 being disengaged and adjustment of the speed of motor 4 is made by adjusting regulating screw 72 of regulator 56. When the proper speed of motor 4 has been established, then cam assemblies 31, 32, 33 and 34 should be properly positioned by turning knob 39 so that circular plate 38 is in proper position for starting. The cam discs 60 and 61 of the respective cam assemblies will have been preselected to provide the proper actuation time for the process or system which is to be controlled. Also, prior to starting motor 4, cam discs should be positioned on the shaft 30 with respect to each other and to have the proper position with respect to the markings on circular plate 38 so that it will give a proper indication of the phase of the timing sequence. With the proper connections being made into bar 70 both from inside and outside case 1, the controller of the present invention is ready to commence its function of controlling the timing of a process when proper connections have been made to the control mechanism.

Assuming, as previously mentioned, that the device is installed to control the switching of towers in a three tower adsorption system, then the cam assemblies will be set to actuate the control valves in such a manner that while one tower will be on stream, a second tower will be on regeneration heating and the third will be on regeneration cooling. In this manner each one of the towers will be positioned on stream for one-third of the time cycle, on regeneration heating for one-third of the time cycle and on regeneration cooling for one-third of the time cycle.

In such operation the cam assemblies 31, 32, 33 and 34 operate valves 48, 49, 50 and 51. These valves are connected so that when the first valve is actuated by the first cam assembly, then all control valves (not shown) which are to be open will be connected to the first cam operated valve for actuation and the remaining control valves will be connected to the other cam operated valves so that the pressure of the control gas will be relieved from them. It should be understood that if the control valves which are to be used are of the type which take pressure to close that a different connection between the cam operated valves and the control valves will be required. In this way the other valves controlling the basic process will be controlled by the cam operated valves in response to the position of the cam assemblies.

Normally, the control of the process will require that one cam assembly be of a different design so that it can control some other process variable, for example, the heating or safety shut-off. It may be desired that the heating be on for half the time and off for half the time of the period during which this individual cam is in its operating position.

With the device of the present invention adjustments in the total time cycle can readily be made in a simple manner by controlling the speed of motor 4. Also, the present invention provides for disengagement of the cam assemblies at any time and for the resetting of their position. Further, the present invention provides a relatively simple cam assembly which can readily be adjusted to provide a period of actuation varying from a minimum to a maximum which is approximately twice the minimum period. The device of the present invention is operated totally by supply gas and is not dependent upon a supply of electricity. It will operate on the same supply gas which is used for actuation of the valves controlling the process. Also, the gas flowing from motor 4 can be conducted to a burner to utilize the heating value of this gas.

What we claim and desire to secure by Letters Patent is:

1. A time cycle controller comprising a gas driven motor, a plurality of cam assemblies, means connecting said motor to said cam assemblies to cause said cam assemblies to rotate, means controlling the speed of said gas driven motor, at least one of said cam assemblies comprising a pair of cam discs, said cam discs being movable with respect to each other to provide for cam adjustment, a cam follower for each of said cam assemblies, and actuation means associated with each cam follower.

2. A time cycle controller according to claim 1 including means for adjusting the position of said cam discs with respect to each other.

3. A time cycle controller according to claim 1 including means associated with said means connecting said motor to said cam assemblies to reduce the speed of rotation of said cam assemblies with respect to the speed of rotation of said motor.

4. A time cycle controller according to claim 1 including means to disengage and engage said means connecting said motor to said cam assemblies.

5. A time cycle device comprising,
a gas driven motor,
a cam shaft,
at least one cam assembly positioned on said cam shaft, and
means connecting said gas driven motor with said cam shaft,
said cam assembly comprising,
a pair of cam discs,
threaded means connecting said cam discs to adjust the respective position of said cam discs, and
means connecting said cam discs to said cam shaft.

6. A time cycle device according to claim 5 wherein said threaded means comprises a screw connected to one of said cam discs and a gear connected to the other of said cam discs and wherein said screw is in threaded engagement with said gear.

7. In a time cycle device a cam assembly including
a cam shaft,
a cam hub mounted on said cam shaft,
a pair of cam discs mounted on said cam hub,
means for securing one of said cam discs to said cam hub,
a cam gear secured on said cam hub, and
a screw engaging said cam gear and secured to the cam disc other than said cam disc which is secured to said cam hub.

References Cited in the file of this patent
UNITED STATES PATENTS
2,009,745    Riesner _____ July 30, 1935